US005911680A

United States Patent [19]

Takeoka

[11] Patent Number: 5,911,680

[45] Date of Patent: Jun. 15, 1999

[54] MOUNTING/DEMOUNTING DEVICE FOR COMBUSTOR FOR USE IN GAS TURBINE

[75] Inventor: Ryoji Takeoka, Takasago, Japan

[73] Assignee: Mitsubishi Heavy Industries, Ltd., Tokyo, Japan

[21] Appl. No.: 08/864,426

[22] Filed: May 28, 1997

[51] Int. Cl.[6] ........ F02C 7/20

[52] U.S. Cl. ........ 60/39.31; 60/722; 431/154; 431/155

[58] Field of Search ........ 60/39.31, 722, 60/740, 39.37; 431/154, 155; 29/889.1, 889.2

[56] References Cited

U.S. PATENT DOCUMENTS

| | | | |
|---|---|---|---|
| 3,842,595 | 10/1974 | Smith et al. | 60/39.36 |
| 4,498,617 | 2/1985 | Guertin et al. | 60/740 |
| 5,233,822 | 8/1993 | Ward et al. | 60/39.02 |
| 5,430,935 | 7/1995 | Yaworsky et al. | 29/889.1 |
| 5,524,430 | 6/1996 | Mazeaud et al. | 60/752 |

*Primary Examiner*—Timothy S. Thorpe
*Assistant Examiner*—Ted Kim
*Attorney, Agent, or Firm*—Wenderoth, Lind & Ponack, L.L.P.

[57] ABSTRACT

In a gas turbine that is equipped, on a casing (100) thereof, with a plurality of combustors (1) in the circumferential direction thereof, there is provided a rail (4) which is supported on a rail receiving stand (3) that is movable on the ground and which is disposed in the form of a circular annulus or circular arc in correspondence with the disposition of the combustors (1). A slide mechanism (5, 5*a*, 6, 6*a*) is mounted on the rail (4) so as to be movable along the rail (4) and is mounted so that the slide mechanism can enter into and retreat from the interior of the casing (100). A grip mechanism (10) is mounted on an end portion of the slide mechanism and grips constituent parts of the combustor (1), such as a tail pipe (7), a nozzle (9) and an inner cylinder (8). Also, in another aspect of the invention, there are provided a rail (12) that is shaped like a circular arc and is revolvably supported on a revolvable carriage (11), and a grip mechanism (13) that grips constituent parts of the combustor

6 Claims, 6 Drawing Sheets

DEMOUNTED STATE OF NOZZLE 9

DEMOUNTED STATE OF COMBUSTOR CASING 2

MOUNTING/DEMOUNTING DEVICE FOR COMBUSTOR FOR USE IN GAS TURBINE

FIELD OF THE INVENTION

The present invention relates to a mounting/demounting device for mounting and demounting of a combustor for use in a large-sized gas turbine such as is used in a thermal power generation plant and various industrial plants.

DESCRIPTION OF THE PRIOR ART

As a conventional apparatus for mounting and demounting a combustor for use in a large-sized gas turbine that is to be used in a thermal power generation plant, there has been provided one that is illustrated in FIG. 6.

Referring to FIG. 6, reference numeral 200 denotes a gas turbine. Reference numeral 1 denotes a combustor which is plurally disposed at equal intervals in the circumferential direction of the gas turbine 200.

In a combustor mounting/demounting apparatus with the conventional technique such as is illustrated in FIG. 6, when replacing the combustor 1 for use in the gas turbine 200, the pipings and the like that are disposed around the combustor 1 are demounted, and then a scaffold 22 is assembled. A workman gets on the scaffold 22 and operates an overhead crane 23 to thereby sling and replace the combustor 1. For this reason it is necessary to remove or restore a number of pipings that have been assembled around the combustor 1 over a wide range, and it is also necessary to perform the work of assembling and disassembling the scaffold 22.

As a result, in the above-mentioned conventional operation, a large number of man-hours are needed, and a long work term is spent, for replacing the combustor 1 and the work incidental thereto. Also, in the above-mentioned conventional operation, the work of the scaffold 22 is performed at an overhead position, and workmen do not always have the appropriate posture, which is dangerous. Further, in the above-mentioned conventional operation, the work such as crane operation and slinging work requires a high level of skill, but is low in working efficiency. The result is that during the performance of the work, the combustor 1 or the main body of the gas turbine 200 is sometimes impaired or damaged.

SUMMARY OF THE INVENTION

Accordingly, an object of the present invention is to provide a mounting/demounting device for mounting and demounting a combustor for use in a gas turbine which does not necessitate the performance of incidental work such as assembling and disassembling a working scaffold, enables a reduction in main-hours and enables a shorter work term.

Also, another object of the present invention is to provide a mounting/demounting device for mounting and demounting a combustor for use in a gas turbine which enables the enhancement of the safety of workers needed for performance of the work and which makes it possible to prevent part from being damaged during the performance of the work.

The present invention has been proposed in order to attain the above objects. A first embodiment which is provided for attaining the above objects is a mounting/demounting device (30) for a combustor for use in a gas turbine that is adapted to mount on, or demount from a casing (100) of the gas turbine a plurality of combustors (1) in the circumferential direction of the casing (100). The mounting/demounting device comprises a rail receiving stand (3) which is movably provided on the ground. A rail (4) is supported on the rail receiving stand (3) and is disposed in the form of a circular annulus or circular arc in correspondence with the disposition of the combustors (1). A slide mechanism (5, 5*a*, 6, 6*a*) is mounted on the rail (4) in such a manner as to be movable along this rail (4), and is mounted so that the slide mechanism can enter into and retreat from the interior of the casing (100). A grip mechanism (10) is mounted on an end portion of the slide mechanism and grips constituent parts of the combustor (1), such as a tail pipe (7), a nozzle (9) and an inner cylinder (8).

A second feature is such that in the above mentioned first embodiment the slide mechanism (5, 5*a*, 6, 6*a*) is preferably composed of a first slide portion (5, 5*a*) that is mounted on the rail (4) and a second slide portion (6, 6*a*) that is mounted to the first slide portion (5, 5*a*) in parallel therewith. A grip mechanism (10) is mounted on its end portion and is provided in such a manner as to be movable relative to the first slide portion (5, 5*a*) in parallel therewith.

Preferably, the rail (4) is constructed of upper and lower semicircular annulus-shaped rail members and is arranged in such a manner that these upper and lower semicircular annulus-shaped rail members are demountably assembled.

A third feature is such that in the above-mentioned second embodiment the first and second slide portions are respectively equipped with slide members (5, 6) which extend in a direction in which the combustor (1) is mounted and slide movers (5*a*, 6*a*) which are movably mounted on the slide members. A connection member (11) connects the respective slide movers (5*a*, 6*a*) to each other.

Since there are provided the first and second two slide portions (5, 5*a*, 6, 6*a*), which are mounted on the rail (4) supported on the rail receiving stand (3), and the grip mechanism (10), which is mounted on one of these two slide portions and intended to grip the constituent parts of the combustor (1), and the grip mechanism (10) can be inserted into the interior of an outer cylinder of the combustor, mounting and demounting of every part among the constituent parts of the combustor (1) can be performed by relatively moving the first and second slide portions (5, 5*a*, 6, 6*a*) and operating the grip mechanism (10). If this mounting/demounting device (30) is sequentially moved on and along the circumference of the rail (4) by the number of the combustors (1), the mounting and demounting of every combustor (1) become possible.

As a result, it becomes possible to automatically perform mounting and demounting of the constituent parts of the combustor without necessitating the performance of the incidental work, such as assembling and disassembling a working scaffold as in the case of the conventional operation. As a result, it becomes possible to perform mounting and demounting of the constituent parts of the combustor with much fewer man-hours than in the conventional operation.

The present invention further includes the following embodiment, where a mounting/demounting device for a combustor for us in a gas turbine is adapted to mount on or demount from a casing (100) of the gas turbine a plurality of combustors (1) in the circumferential direction of the casing (100). The mounting/demounting device comprises a revolvable carriage (11) that is movably provided on the ground, a rail (12) that is shaped like a circular arc and is revolvably supported on the revolvable carriage (11), and a grip mechanism (13) which is revolvably supported on the rail (12) and grips the constituent parts of the combustor (1) with its end portion.

Since the rail (12) is shaped like a circular arc and it is arranged that this circular arc-shaped rail (12) itself is caused to revolve, and the grip mechanism (13) is also provided in such a manner as to be revolvable relatively to the rail (12), the device is made small and compact in size compared to the device that is provided in each of the first to third embodiments and features, the manufacturing cost therefor is also reduced.

Summarizing the foregoing, according to the present invention, it becomes possible to perform automatic mounting and demounting of the combustor (1) that is large in weight, with the result that it becomes unnecessary to perform incidental work such as assembling and disassembling the scaffold as performed in the conventional operation, to thereby enable a reduction in combustor mounting and demounting man-hours and remarkably shorten the period for the mounting/demounting work.

In addition, it is also possible to avoid the performance of the dangerous work when mounting and demounting the combustor (1). Also, the impairment of parts which occurs in the conventional operation due to poor working efficiency is also avoided. Further, it is not necessary to perform slinging work, which necessitates the use of a high level of skill.

DETAILED DESCRIPTION OF THE PREFERRED EMBODIMENTS

Figure 1:
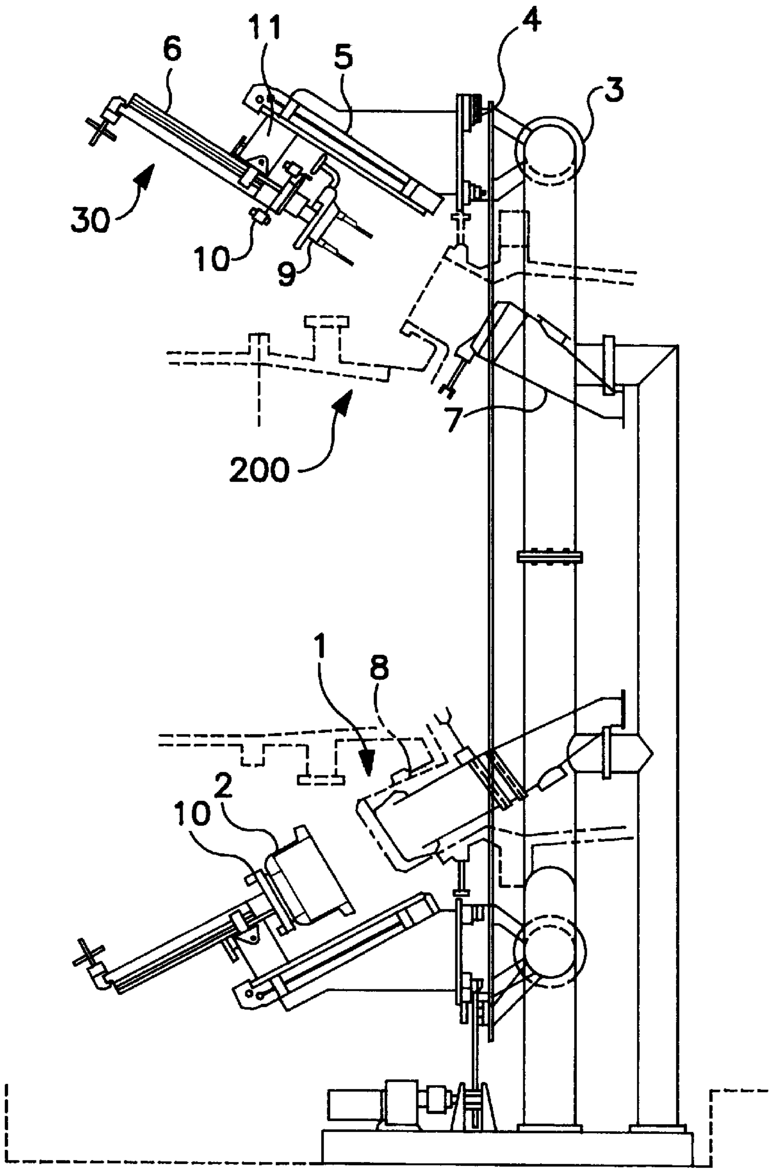
FIG. 1 is a side view illustrating a mounting/demounting device for a combustor for use in a gas turbine according to a first embodiment of the present invention.
Figure 2:
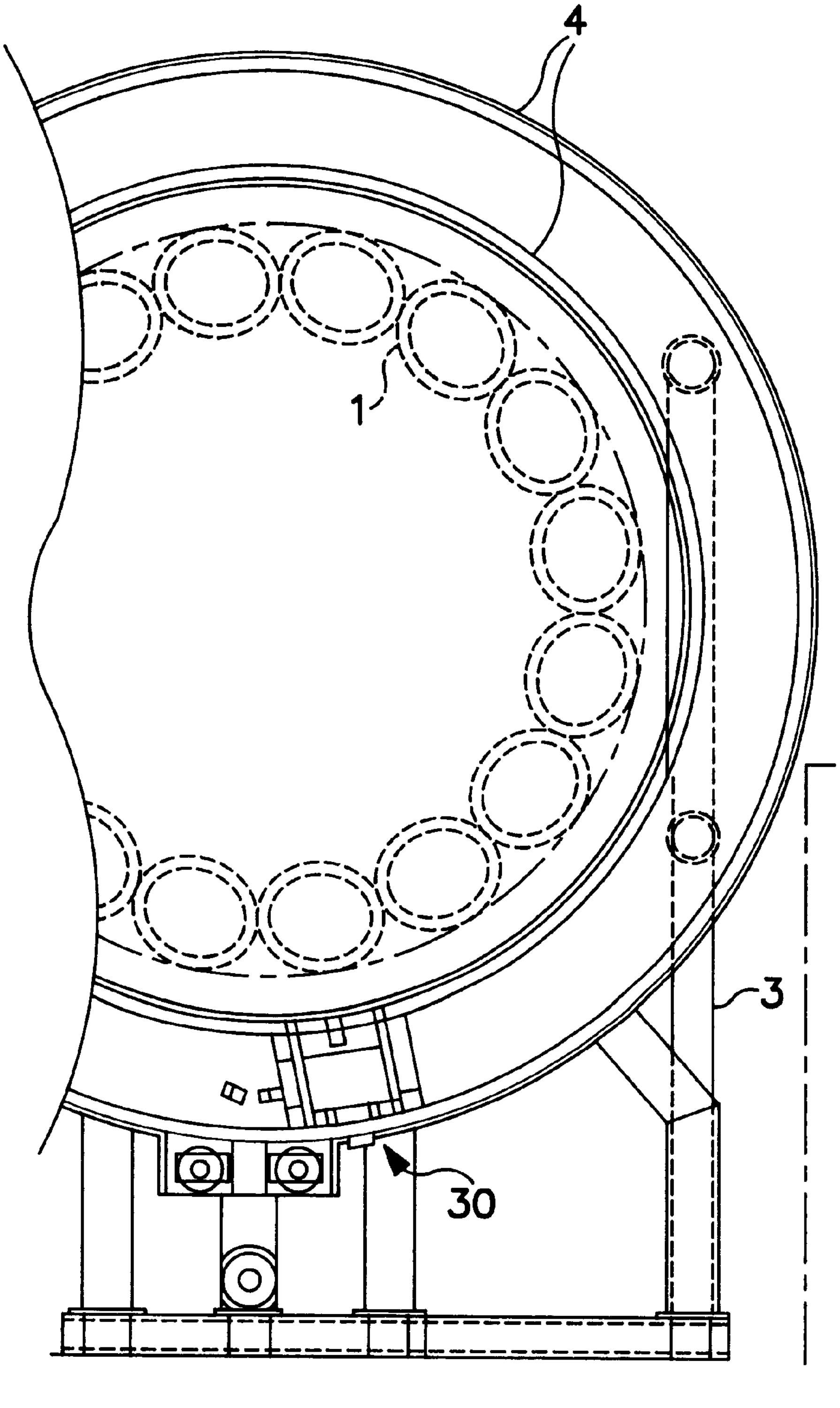
FIG. 2 is a front view illustrating the mounting/demounting device for a combustor for use in a gas turbine according to the first embodiment of the present invention.

Referring to FIGS. 1 and 2, a reference numeral 200 denotes a gas turbine and a reference numeral 1 denotes a combustor which is plurally disposed in the circumferential direction of the gas turbine 200. A reference numeral 2 denotes an outer cylinder of the combustor 1, a reference numeral 7 denotes a tail pipe, a reference numeral 8 denotes an inner cylinder and a reference numeral 9 denotes a nozzle.

On the outside of the outer cylinder 2 there is erected a rail stand 3. On this rail stand 3 there is mounted a rail 4 that is shaped like a circular annulus. On the rail 4 there are provided two slide portions, i.e., a first slide portion 5 and a second slide portion 6, each of which is equipped with a rack mechanism and is slid automatically (by electric power) or manually (by a screw handle feed system) as described later. Of these slide portions 5 and 6, the second slide portion 6 has mounted thereon a grip portion 10 which grips the tail pipe 7 of the combustor 1 (in FIGS. 3(*a*)–3(*c*)) and can fix thereto the inner cylinder 8, outer cylinder 2 and nozzle 9.

Figure 3A:
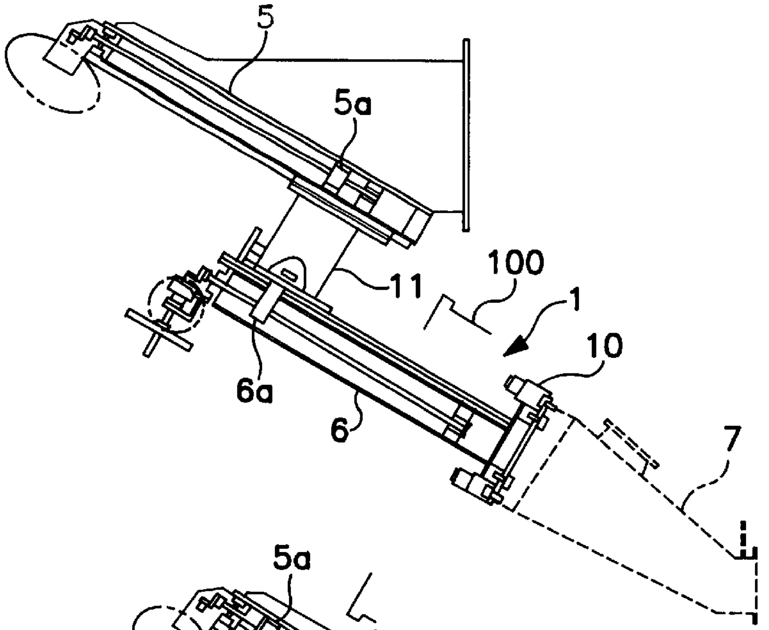
FIGS. 3(*a*), 3(*b*) and 3(*c*) are views illustrating a mode of procedure in which constituent parts of the combustor are mounted with the use of the mounting/demounting device according to the first embodiment of the present invention.
Figure 3B:
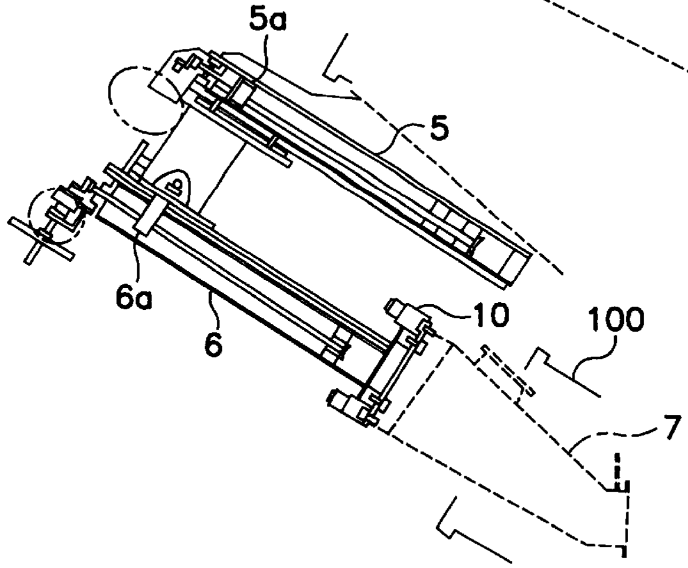
Figure 3C:
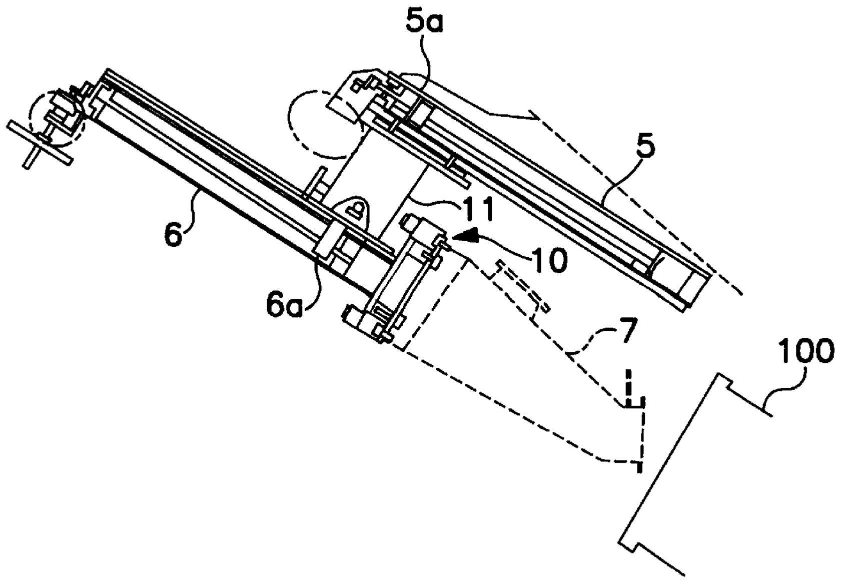

Also, as illustrated in FIGS. 3(*a*)–3(*c*), the first slide portion 5 and the second slide portion 6 are respectively provided with a slide mover 5*a* and a slide mover 6*a* which are respectively movable in the longitudinal directions thereof. And, the slide movers 5*a* and 6*a* are connected to each other via a slide plate 11.

A mounting/demounting device 30 is composed of the slide portions 5, 6 and grip portion 10, and provided in such a manner as to be circumferentially movable on the rail 4 that is shaped like a circular annulus. Accordingly, by sequentially moving the mounting/demounting device 30 along the circular annulus-shaped rail 4, it becomes possible to mount or demount the combustors 1 that are disposed on and along the circumference of the gas turbine 200.

Also, the circular annulus-shaped rail 4 is made into upper and lower half rail members, and these half rail members are thereby made dividable or combinable. Usually only the lower half rail member, shaped like a semicircular annulus, is kept mounted on the rail stand 3. As necessity arises, the upper half rail member, similarly shaped like a semicircular annulus, is assembled.

The procedural mode for mounting or demounting the combustor 1 by the above-constructed combustor replacing device will now be explained with reference to FIG. 3.

Referring to FIG. 3(*a*), when the slide mover 5*a* of the first slide portion 5 is moved toward the combustor 1 (toward the right side of FIG. 3(*a*)), the slide mover 6*a* is also moved via the slide plate 11 that is fixed to the slide mover 5*a*. And, when the second slide portion 6 is moved, the grip portion 10 that is mounted thereon is inserted deep into the casing 100 to grip the tail pipe 7.

Subsequently, as illustrated in FIG. 3(*b*), when the slide mover 5*a* is drawn out in the opposite direction (in the leftward direction of FIG. 3(*b*)), the slide mover 6*a* is also moved in this opposite direction via the slide plate 11. The second slide portion 6 and the grip portion 10 are thereby drawn out while gripping the tail pipe 7.

Further, as illustrated in FIG. 3(*c*), when the slide mover 6*a* of the second slide portion 6 is pulled in the direction opposite to the location side of the combustor 1, since the slide plate 11 is locked by the first slide portion 5 and is therefore located at a fixed point, the grip portion 10 that grips the tail pipe 7 is further moved along with the second slide portion 6 in the direction away from the location side of the combustor 1. The tail pipe 7 is thereby drawn to the outside of the casing 100.

If the above-mentioned operation is performed with respect to every constituent part of the combustor 1, such as the nozzle 9, inner cylinder 8 and outer cylinder 2, all constituent parts can be easily drawn outside of the casing 100. It is to be noted that when such parts are assembled within the combustor 1, it is sufficient to perform an operation reverse to the above-mentioned operation.

Figure 4:
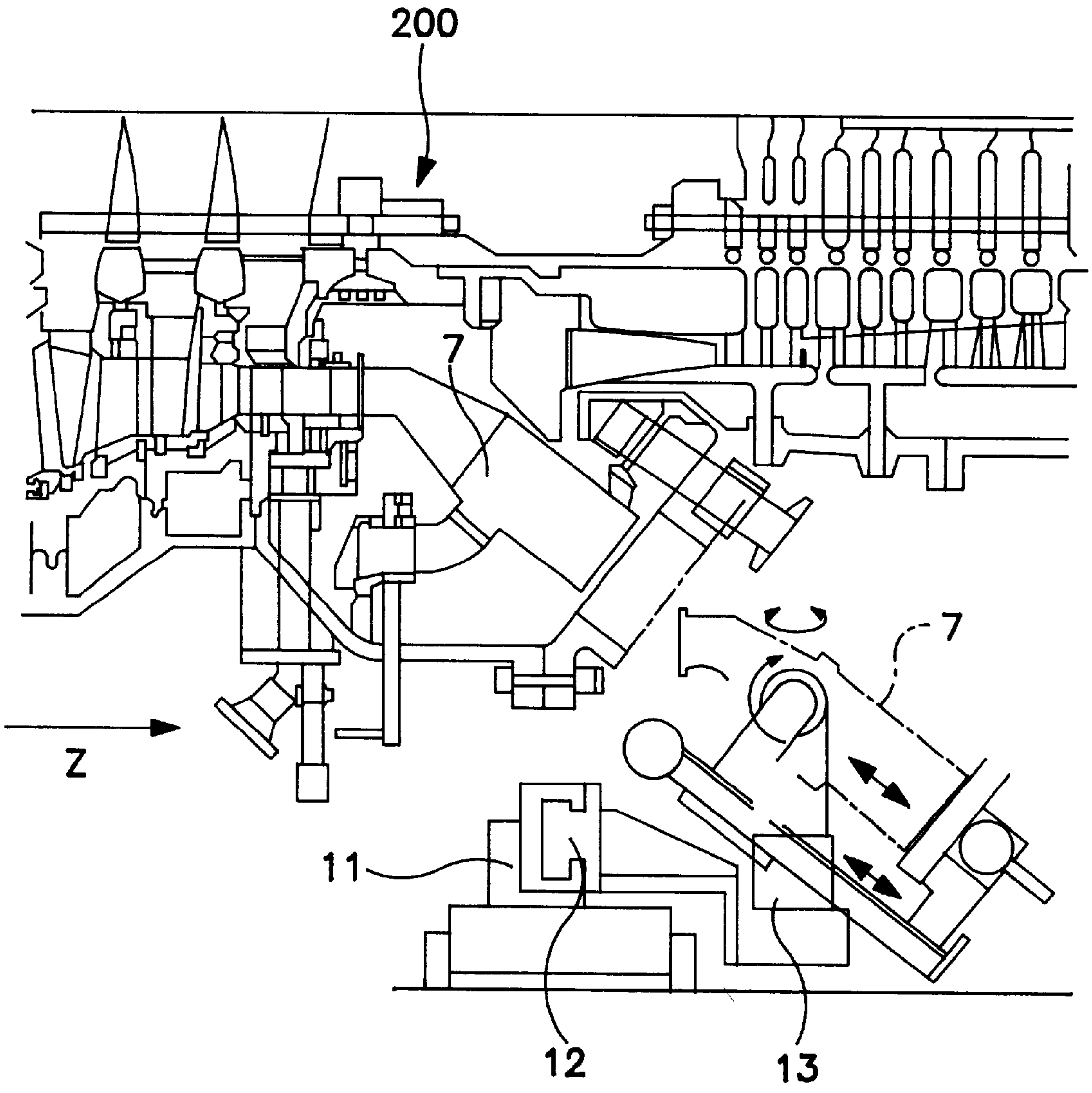
FIG. 4 is an outer view illustrating a mounting/demounting device for a combustor for use in a gas turbine according to a second embodiment of the present invention.
Figure 5:
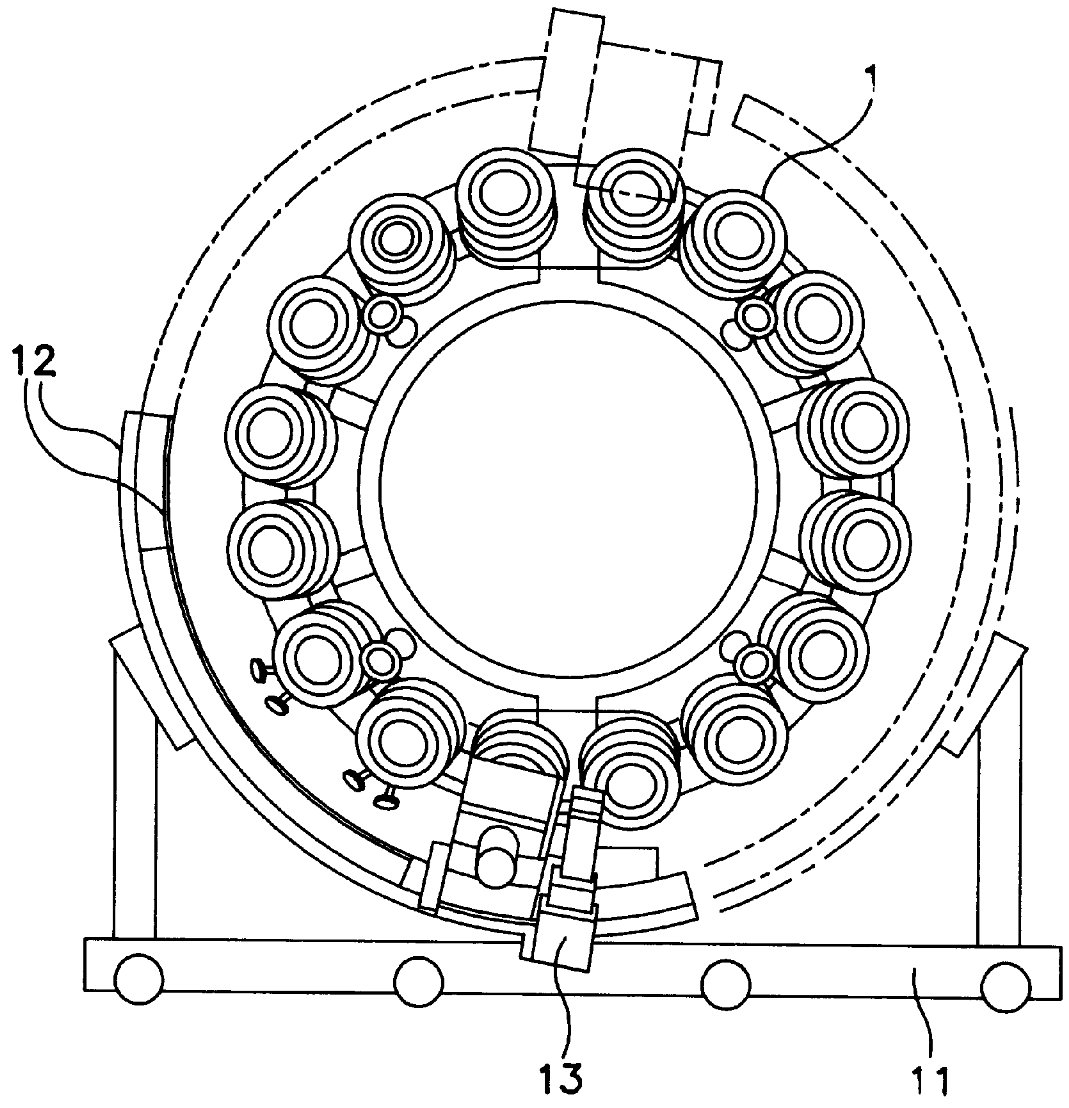
FIG. 5 is a view taken from an arrow direction Z of FIG. 4.
Figure 6:
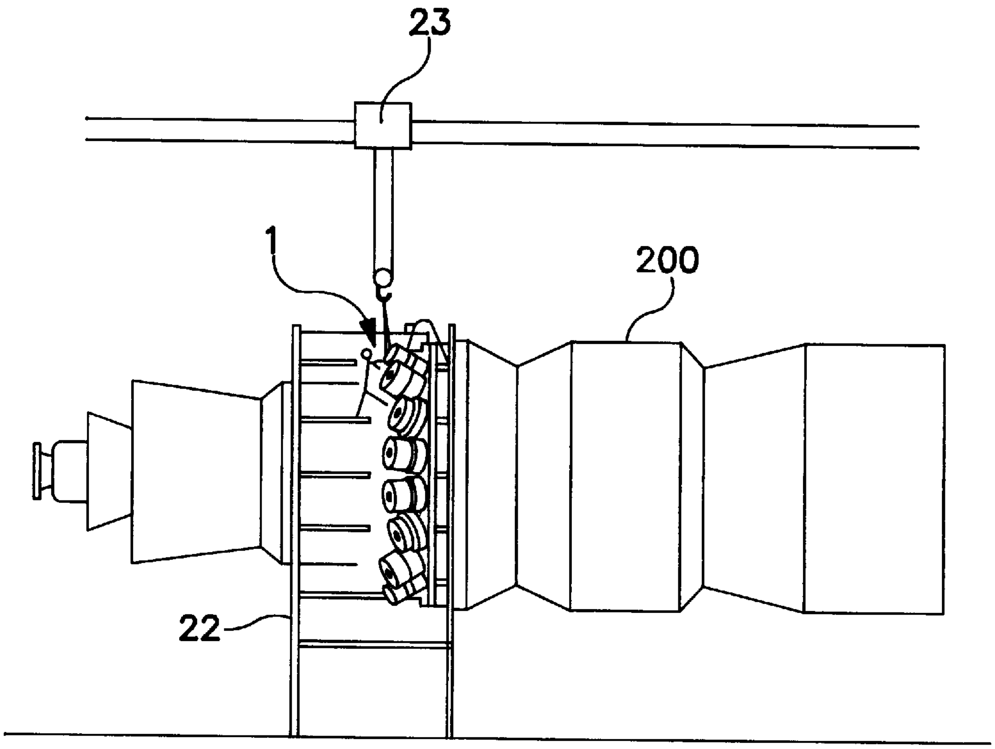
FIG. 6 PRIOR ART
FIG. 6 is an outer view illustrating a conventional mounting/demounting device for a combustor for use in a gas turbine according to a conventional technique.

In a second embodiment illustrated in FIGS. 4 and 5, a circular arc-shaped rail 12 is supported on a revolvable carriage 11 so as to be revolvable thereon in the circumferential direction thereof. A grip mechanism 13 for gripping the constituent parts of the combustor 1 is provided on this circular arc-shaped rail 12 so as to be revolvable thereon. Reference numeral 200 denotes a gas turbine and reference numeral 7 denotes a tail pipe.

In this embodiment, since the rail 12 is formed into a circular arc to thereby make the rail 12 itself revolvable, and the grip mechanism 13 is also mounted on the rail 12 so as to be revolvable relative thereto, the device becomes smaller and more compact in size and lower in manufacturing cost than in the case of the first embodiment.

While the preferred form of the present invention has been described, variations thereto will occur to those skilled in the art within the scope of the present inventive concepts, which are delineated by the following claims.

I claim:

1. A mounting/demounting device for combustors of a gas turbine that is adapted to mount on or demount from a casing of the gas turbine a plurality of combustors in a circumferential direction of the casing, the mounting/demounting device comprising:

a rail receiving stand which is movably provided on the ground;

a rail which is supported on the rail receiving stand and is disposed in the form of a circular annulus or circular arc in correspondence with the disposition of the combustors;

a slide mechanism which is mounted on the rail so as to be movable along the rail and is mounted so that the slide mechanism can enter into and retreat from an interior of the casing; and a grip mechanism which is mounted on an end portion of the slide mechanism and grips constituent parts of the combustor including a tail pipe, a nozzle and an inner cylinder.

2. A mounting/demounting device for combustors of a gas turbine as set forth in claim 1, wherein the slide mechanism is composed of a first slide portion that is mounted on the rail and a second slide portion that is mounted to the first slide portion in parallel therewith and that has the grip mechanism mounted on an end portion thereof and that is provided so as to be movable relative to the first slide portion in parallel therewith.

3. A mounting/demounting device for combustors of a gas turbine as set forth in claim 2, wherein the first and second slide portions are respectively equipped with slide members which extend in a direction in which the combustor is mounted and slide movers which are movably mounted on the slide members and further comprising a connection member for connecting the respective slide movers to each other.

4. A mounting/demounting device for combustors of a gas turbine as set forth in claim 1, wherein the rail is constructed of upper and lower semicircular annulus-shaped rail members, the upper and lower semicircular annulus-shaped rail members being assembled demountably.

5. A mounting/demounting device for combustors of a gas turbine as set forth in claim 2, wherein the rail is constructed of upper and lower semicircular annulus-shaped rail members, the upper and lower semicircular annulus-shaped rail members being assembled demountably.

6. A mounting/demounting device for combustors of a gas turbine that is adapted to mount on or demount from a casing of the gas turbine a plurality of combustors in a circumferential direction of the casing, the mounting/demounting device comprising a revolvable carriage that is movably provided on the ground, a rail that is shaped like a circular arc and is revolvably supported on the revolvable carriage, and a grip mechanism which is revolvably supported on the rail and grips constituent parts of the combustor by an end portion thereof.

* * * * *